United States Patent

McNamara

[15] 3,661,200
[45] May 9, 1972

[54] ABSORPTION REFRIGERATION AND AIR CONDITIONING SYSTEM

[72] Inventor: Thomas J. McNamara, 317 Harding Ave., Des Plaines, Ill. 60016

[22] Filed: Nov. 17, 1969

[21] Appl. No.: 877,373

[52] U.S. Cl. ........................165/42, 62/112, 62/238, 62/243, 62/476, 165/43
[51] Int. Cl. ...........................................B60h 3/00
[58] Field of Search ........... 62/122, 238, 243, 476; 165/42, 165/43; 236/1 C, 12

[56] References Cited

UNITED STATES PATENTS

| | | | |
|---|---|---|---|
| 3,101,599 | 8/1963 | Pippert et al. | 62/238 |
| 1,608,982 | 11/1926 | Hatch | 165/43 |
| 2,136,626 | 11/1938 | Lind | 62/238 X |
| 2,141,926 | 12/1938 | Moncrief | 165/43 X |
| 2,148,571 | 2/1939 | Meyerhoefer | 62/238 |
| 2,481,520 | 9/1949 | Knoy | 62/238 X |
| 2,787,129 | 4/1957 | Evans | 165/43 X |
| 2,910,243 | 10/1959 | Bowman | 236/12 |
| 2,915,298 | 12/1959 | Hamlin et al. | 165/36 X |
| 2,983,487 | 5/1961 | MacKay | 236/12 X |
| 3,142,161 | 8/1964 | House | 62/238 |
| 3,270,516 | 9/1966 | McNeeley | 62/476 X |

Primary Examiner—Milton Kaufman
Assistant Examiner—P. D. Ferguson
Attorney—Hofgren, Wegner, Allen, Stellman & McCord

[57] ABSTRACT

An absorption refrigeration and air conditioning system using a mixture of water and ammonia and helium to maintain a constant vapor pressure and wherein the system uses a generator for the refrigeration circuit which is fitted to the exhaust line of a vehicle and wherein the space to be cooled or refrigerated has a heat transfer unit. This unit is supplied with a liquid from a chiller in the refrigeration circuit and with liquid from a cooling system of the vehicle, with both liquids including an anti-freeze mixture, such as ethylene glycol and wherein a mixing valve controls the mixture of the liquids from the two sources to provide a desired temperature within the space to be cooled.

7 Claims, 7 Drawing Figures

INVENTOR.
THOMAS J. McNAMARA

ABSORPTION REFRIGERATION AND AIR CONDITIONING SYSTEM

BACKGROUND OF THE INVENTION

This invention relates to an absorption refrigeration system having new and improved components and use of helium with a conventional ammonia and water mixture, whereby the helium maintains constant vapor pressure, without any fire or explosion hazards, such a system wherein the cooling output of the absorption refrigeration circuit is transferred to a liquid through a chiller functioning as a heat interchange unit whereby the refrigeration circuit can be separated from the space to be cooled and further wherein the system is designed to utilize waster heat from an engine of a mobile vehicle and which system does not interfere with or impair, in any way, the operation of the vehicle.

Absorption refrigeration systems for mobile applications utilizing exhaust gases are known, as shown in U.S. Pat. No. 2,667,040. Additional patents disclosing air conditioning systems using heat derived from the exhaust gases are Nos. 2,783,622, 2,953,907, and 3,021,690. None of these patents show an absorption refrigeration system utilizing the exhaust gases by way of a generator for the absorption refrigeration circuit which can fit onto the exhaust pipe of a vehicle without any modification of the exhaust line and without any resulting effect on the efficiency of the exhaust system. Additionally, the structures shown in the patents do not provide for positioning of the absorption refrigeration circuit entirely outside the space to be cooled and with a heat interchange unit exchanging heat with a liquid medium which can pass to a heat transfer unit in the vehicle space, or other space to be cooled, and which can be the same liquid as used in the cooling system of the vehicle engine, whereby with common connections and a mixing valve the desired temperature can be maintained in the space to be cooled.

SUMMARY

This disclosure relates to an improved refrigerating system for use in refrigeration and air conditioning, using the absorption principle, which is particularly applicable to mobile units, such as automobiles; buses; trucks; railway cars; and mobile trailers, both the mobile home type and commercial refrigerated type.

An object of the invention is to provide an absorption refrigeration system applicable to mobile air conditioning which efficiently utilizes the exhaust heat from the engine, which may be either diesel, steam, internal combustion, or a turbine for source of operating energy, without interfering with the normal operation of the engine. The absorption refrigeration system operates without adding any obstruction in the path of the exhaust gases from the engine because the generator of the refrigeration system fits onto the exhaust pipe and can be installed as original equipment or installed subsequently. The generator may facilitate the efficiency of the engine by condensing exhaust gases to reduce back pressure.

Another object of the invention is to provide an absorption refrigeration system, as defined in the preceding paragraph, wherein the system produces cooling in a heat interchange unit and, more specifically, a chiller which passes a liquid medium therethrough, such as an antifreeze mixture containing ethylene glycol, wherein the ethylene glycol solution is cooled in the chiller and circulated by means of a pump through a heat transfer unit in the passenger compartment or in the mobile space to be cooled. This makes it possible to keep all the high pressure components in the refrigeration circuit entirely outside of the space to be cooled increasing safety.

Still another object of the invention is to provide a system as defined in the preceding paragraph wherein the glycol solution circulated through the chiller can be in circuit with the engine cooling system of the vehicle and the pump of such circulating system is used and the solution will be directed to a mixing valve along with the ethylene glycol solution of the engine cooling system. The mixing valve is manually set to produce the desired mixing of the cooled and heated liquids which mixture flows through the heat transfer unit to produce the desired temperature in the space to be cooled. The mixing valve provides an infinite number of control positions over the complete range of control from 100 percent flow from the chiller to 100 percent flow from the engine cooling system and can also have a shut-off position whereby the mixing valve can replace the conventional heater controls of a Vehicle.

An additional object of the invention is to provide an absorption refrigeration system employing a water and ammonia mixture in combination with helium which, either combined or separately, is non-toxic and will not burn or explode.

Still another object of the invention is to provide an absorption refrigeration system having as a component part a generator which, because of its physical shape, can be installed on the exhaust pipe of a vehicle without cutting into the exhaust pipe and wherein it is shaped to cause the output performance of the generator to be limited to the maximum amount required to produce the intended full capacity of the refrigeration system, without additional controls or control components added to the system. In effect, the heat transfer from the exhaust system to the generator is limited by the design of the generator to avoid additional controls to limit the output of the refrigeration system.

It is also an object of the invention to provide a simple, low-cost, easily installed absorption refrigeration system for use with vehicles which takes the waste heat from the exhaust gases and provides for cooling of a solution which can mix with the solution for cooling the engine of the vehicle and pass through a conventional heater unit of the vehicle for cooling as well as heating of the vehicle.

DESCRIPTION OF THE PREFERRED EMBODIMENTS

Figure 1:
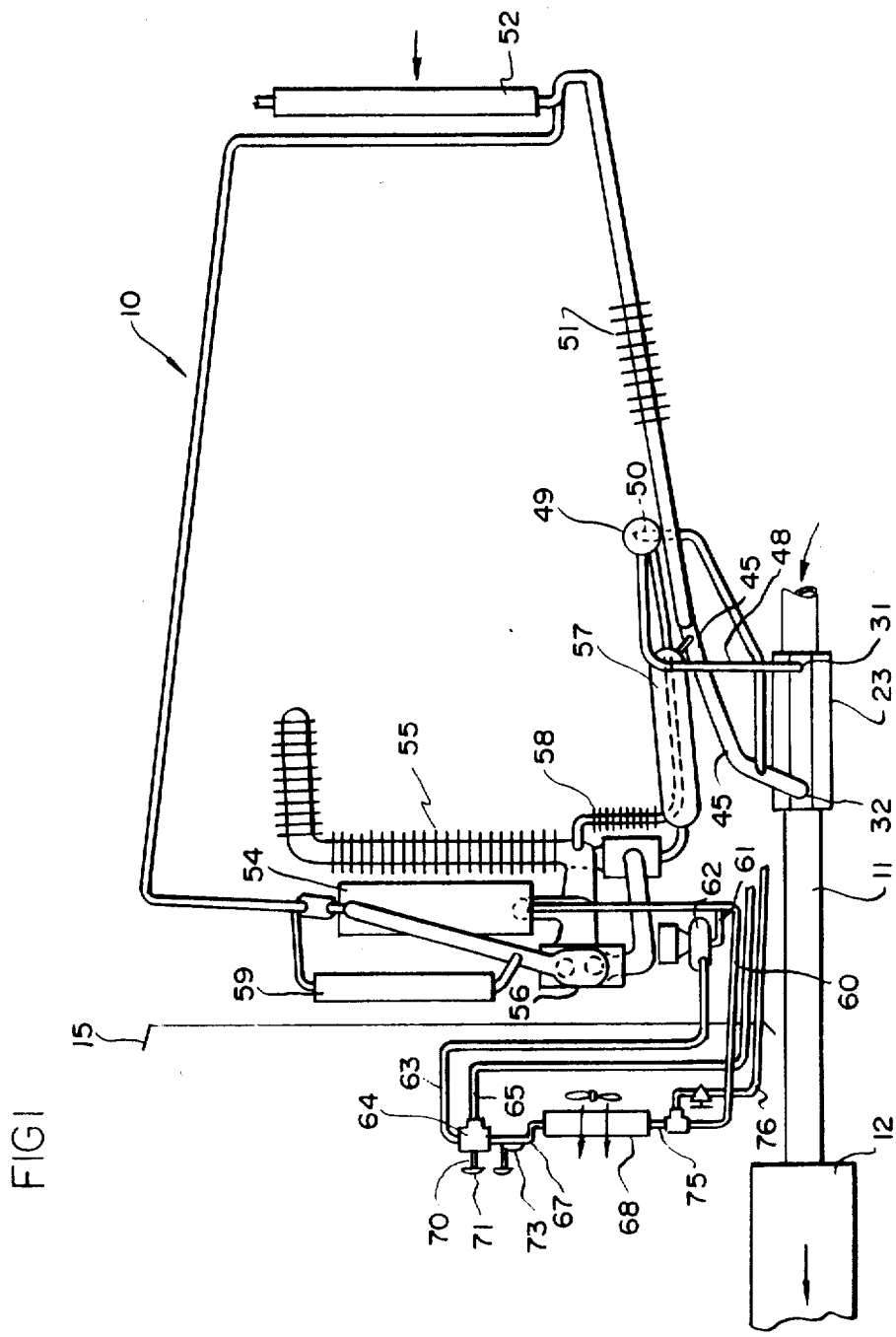
FIG. 1 is a plan view of the absorption refrigeration system, shown in association with components of a vehicle.
Figure 2:
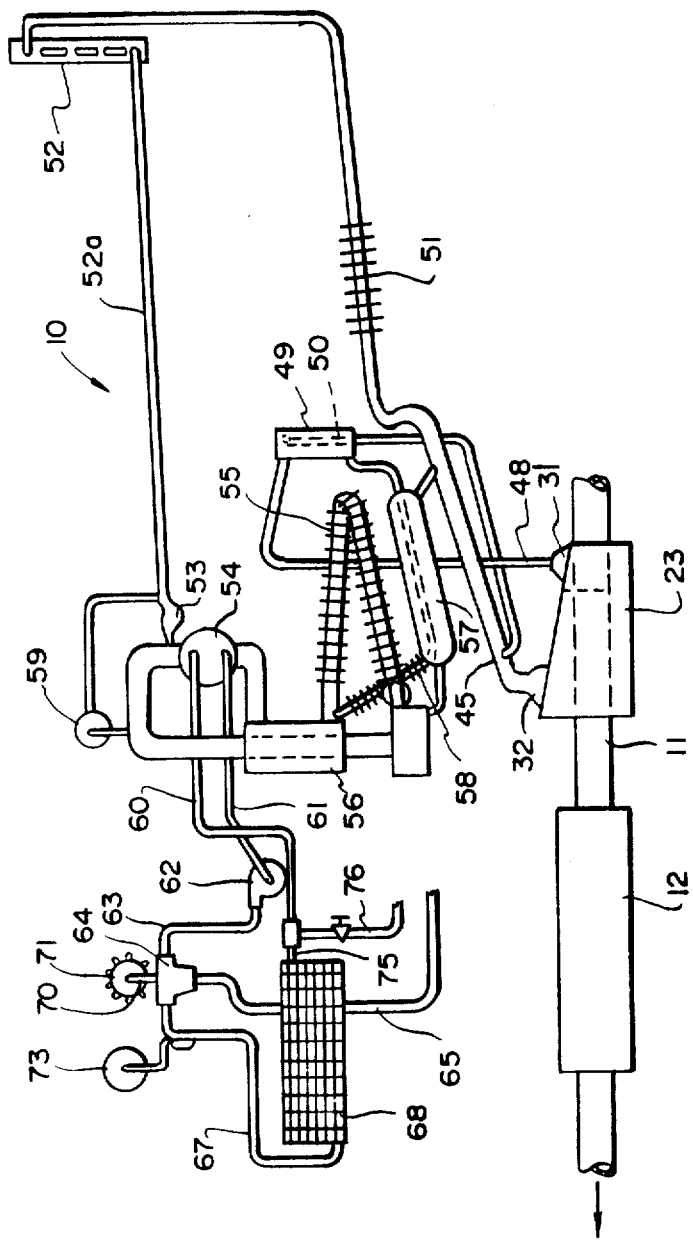
FIG. 2 is an elevational view of the structure shown in FIG. 2.

The air conditioning and refrigeration system is shown generally in FIGS. 1 and 2 and includes an absorption refrigeration circuit, indicated generally at 10, which is associated with components of a vehicle, including an exhaust pipe 11 for exhaust gases from a vehicle engine and may have a muffler 12. The engine can be of many different types, including diesel, steam, internal combustion, or turbine. The vehicle also has a fire wall 15, separating the engine space from the passenger compartment and, as shown in FIG. 1, the components of the absorption refrigeration circuit are in the space to the right of the fire wall which houses the engine, while a manual control and heat transfer unit are located to the left of the fire wall 15 in the passenger compartment.

The absorption refrigeration circuit will be described. The hot exhaust waste gases from the vehicle engine are directed through the exhaust conduit in the form of the pipe 11 and through the muffler 12, when a muffler is used, and are then exhausted to the atmosphere. As the exhaust gases pass through the pipe 11, heat is transferred into a generator 23.

The generator 23 is formed of sheet metal having a pair of outer walls 24 and 25 and a pair of relatively narrow bottom walls 26 and 27 which connect the outer walls with an interior, concave wall 28 contoured to fit against the exhaust pipe 11. The ends of the generator are closed off by a pair of ends with one end being indicated at 29 and the top of the generator 30 has a pair of ports 31 and 32. An internal baffle 33 is downwardly concave to fit against the concave outer wall 28 of the generator but terminating short of the bottom walls 26 and 27 to define two interconnecting spaces within the generator.

Figure 4:
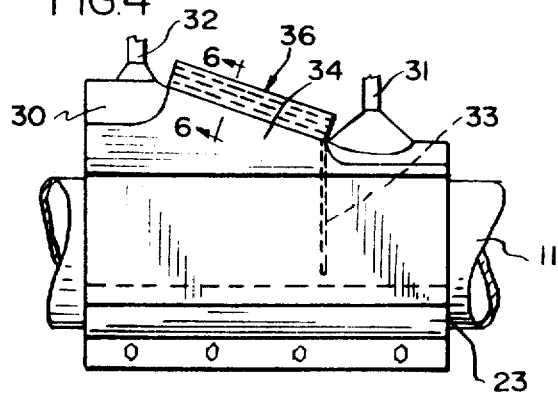
FIG. 4 is an enlarged, elevational view of the generator shown in FIG. 2 in association with the exhaust pipe.
Figure 5:
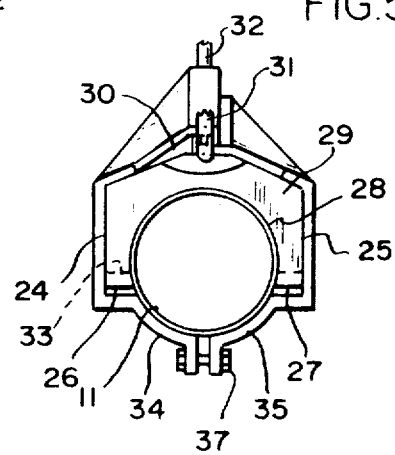
FIG. 5 is an end view of the structure shown in FIG. 4.
Figure 6:
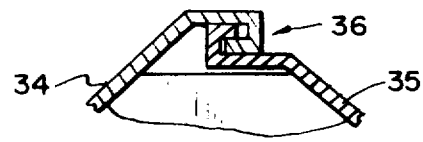
FIG. 6 is a fragmentary section, taken generally along the line 6—6 in FIG. 4.

The generator is designed to provide a certain amount of area of contact with the exhaust pipe 11 and thereby control the maximum rate of heat transfer to the generator from the exhaust pipe, which provides a self-imposed upper limit on the amount of heat applied to the absorption refrigeration system. The generator, being formed of sheet metal components, has some degree of flexibility to fit over the exhaust pipe and is then brought into tightly-clamped Relation to the exhaust pipe by clamp structure including a pair of clamp members 34 and 35 which are releasably connected together by an interlocking finger arrangement, indicated generally at 36 along the upper parts thereof which is a sloped line, as shown in FIG. 4, and with the lower ends of the clamp members being bolted together by bolts 37 wherein the clamp members are drawn together and tightly clamp the generator to the exhaust pipe. The outside surfaces of clamp members 34 and 35 have insulation applied thereto.

The generator 23 contains an aqua-ammonia solution which is at a lower temperature than the exhaust pipe and is thereby heated. As the water-ammonia solution is heated, ammonia vapor and a small amount of water vapor is driven off and is directed through the port 32 in the generator 23 into an analyzer 45. The Vertical partition 33 inside the generator 23 divides the generator into two chambers, with the passage left at the bottom of the baffle 33 allowing flow of the liquid water-ammonia solution from the left side of the baffle to the right side thereof, as viewed in FIG. 4. As the ammonia vapor and water vapor move up through the analyzer, they flow countercurrently to a strong water-ammonia solution flowing to the generator 23 through the analyzer 45. This strong water-ammonia solution flowing toward the generator 23 is much cooler than the vapor leaving the generator 23 and a selective condensation of water vapor occurs and the ammonia vapor portion of the vapor mixture correspondingly increases. A portion of the water-ammonia solution in the generator 23 passes under the baffle 33 and into the right-hand chamber, as shown in FIGS. 2 and 4 and is discharged through the port 31 and a bubble pump 48 as a stream of intermixed slugs of weak water-ammonia solution and vapor bubbles into the liquid vapor separator 49. The vapor passes down through the central pipe 50 in the liquid vapor separator 49 and bubbles through the strong solution and the upper part of the analyzer, losing some of its water vapor content, and joins the ammonia gas which is driven off in the chamber of generator 23 communicating with port 32. The combined gas streams flow through the air cooled rectifier 51 where additional water vapor is condensed and drained back to the analyzer 45. The ammonia vapor leaving the rectifier 51 contains only a very small amount of water vapor and passes to the air-cooled condenser 52 where it is condensed. In passing through the air-cooled condenser 52, the condensing vapor meets helium gas in a line 52a provided from a helium reserve in the helium storage container 59. Liquid ammonia in the presence of helium gas passes through the liquid trap 53 in which cooling of the liquid ammonia occurs as some of the liquid ammonia evaporates as it passes to a chiller 54. The function of this chiller as a heat interchange unit will be more fully described hereinafter.

As the liquid ammonia passes through the chiller 54, it evaporates and combines with the warmer helium gas rising from the absorber 55 and the combined cold vapors of ammonia mixed with helium fall through the gas heat exchanger 56 cooling the helium gas rising from the air-cooled absorber 55. The hot solution of weak ammonia liquid from the separator 49 is cooled in passing through the liquid heat exchanger 57 and is further cooled in passing through the air-cooled forecooler 58. The cooled solution flows to the absorber 55 where it absorbs ammonia vapor. This absorption process releases heat which is removed by air cooling of the absorber 55. The strong ammonia solution flows by gravity through the liquid heat exchanger shell 57 where it absorbs heat, flows through the analyzer 45 and flows through a port 32 and to the lefthand chamber in generator 23, as shown in FIG. 2, at which point the process repeats.

The helium reserve in the helium storage container 59 compensates automatically for changes in the temperature of the ambient air flowing over the air-cooled condenser 52. As the ambient air temperature rises, some ammonia vapor issues from the air-cooled condenser forcing helium from the helium storage container 59 and raising the pressure throughout the system. The increased system pressure correspondingly raises the saturation temperature offsetting the rising temperature of the ambient air and enabling the condensation of the ammonia vapor to continue in the air-cooled condenser.

The chiller 54 provides an interchange unit from the absorption refrigeration system 10 to a liquid medium for use in cooling the space of a vehicle or structure associated with the vehicle. The chiller has an inlet line 60 and an outlet line 61 passing therethrough for a liquid medium, such as the conventional anti-freeze solution for a vehicle including ethylene glycol, with the fluid flow being induced by an electric pump 62 provided to have fluid flow independent of an engine cooling system. The outlet of the pump is connected by a line 63 to a manually controlled mixing valve 64. This mixing valve has a second inlet line 65 leading from the vehicle engine jacket whereby the two inlet lines 63 and 65 leading to the mixing valve provide hot liquid from the conventional water pump of a water-cooled engine and cool liquid from the chiller which can be mixed at the mixing valve with the resulting mixture passing through a line 67 leading to a heater in the passenger compartment of the vehicle. This heater may be either the type having the conventional heater coil or a fan coil.

Figure 3:
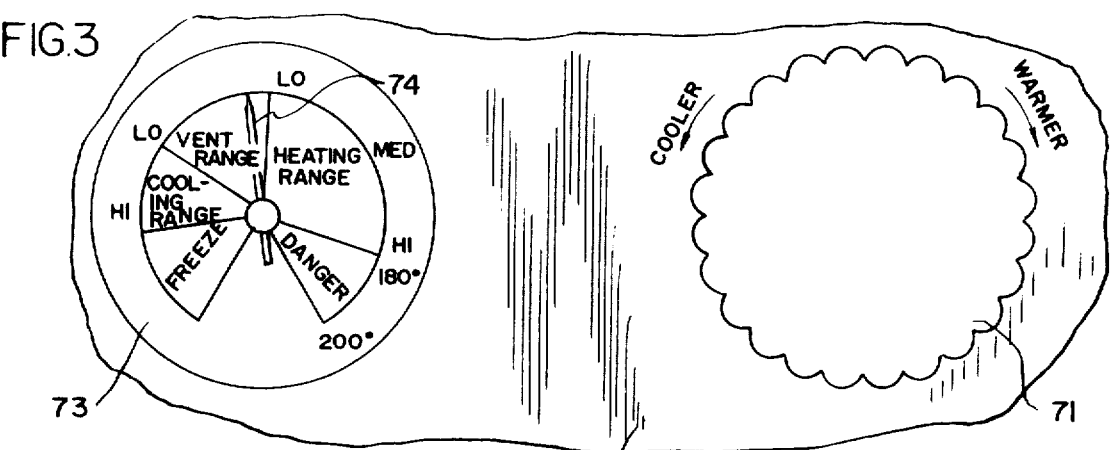
FIG. 3 is a fragmentary elevational view of a control panel for a vehicle providing for temperature indication and manual control thereof.

The mixing valve 64 is a purchased item having the two inlets and a single outlet and having a valve stem 70 rotatably positionable by a knob 71, with this knob 71 being disposed on a control panel 72 in the passenger compartment, as shown in FIG. 3. The control panel also includes a thermometer 73 connected into the line 67 leading to the heater, with this thermometer having a dial which is calibrated in the manner as shown in FIG. 3 to provide, by means of the position of a pointer 74, an indication of the temperature existing in the line 67 which is correlated to the various categories shown on the dial for heating or cooling of the passenger compartment and indicating extreme conditions.

The outlet side of the heater 68 is connected to a line 75, with a fitting having a pair of branches with a branch line 76 leading back to the radiator for the vehicle engine and the other branch line being the line 60 leading into the chiller 54.

With the foregoing system, heated solution, such as ethylene glycol solution, pumped from the engine cooling jacket by the water pump enters one of the ports of the mixing valve 64 and is there blended with ethylene glycol solution coming from the chiller 54 and with the temperature of the blended solution being indicated by the thermometer 73.

The mixing valve mixes both heated and cooled ethylene glycol solutions to provide the desired temperature passing to the heater and thus provides the mixing of solutions to provide both heating and cooling for the passenger space and can substitute for the normal heater controls now used in a vehicle. This method relies upon control of the mixed ethylene glycol solution temperature, rather than attempting to control the amount of cooling being produced by the absorption refrigeration circuit. This results in a simplified method of controlling compartment temperature, with a minimum amount of structure to obtain the control.

Figure 7:
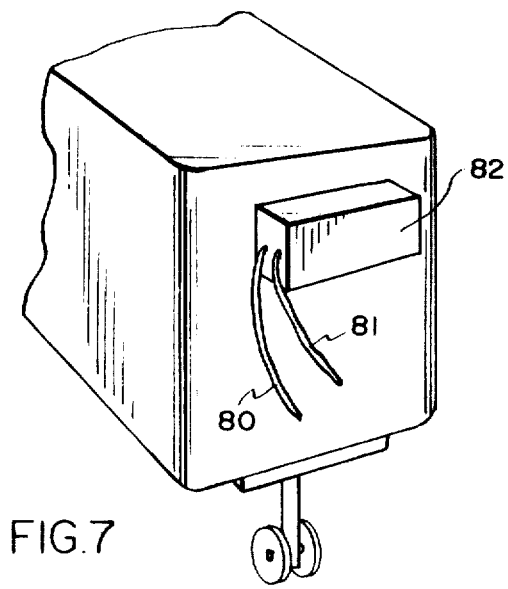
FIG. 7 is a fragmentary, perspective view, showing the cooling for a trailer unit.

The system disclosed herein can alternately be used for cooling either a commercial-type or house-type trailer with the commercial-type trailer shown in FIG. 7 wherein a pair of insulated flexible hoses 80 and 81 can connect to the lines 60 and 61, which pass through the chiller 54, whereby ethylene glycol solution can be directed to a heat transfer unit 82 communicating with the interior of the trailer. The hoses 80 and 81 can be provided with quick-connect fittings for connection to lines 60 and 61 extending to the chiller. The ethylene glycol solution flowing to the unit 82 can pass through the coil therein whereby cooling is directed into the trailer by a fan unit conventionally provided in such units.

From the foregoing, it will be seen that a unit is provided which operates with a minimum amount of maintenance and adjustment because of its simplicity and which utilizes the waste heat from the engine. An opening into the exhaust system is not required and the maximum cooling capacity produced over the entire range is limited by the heat transfer characteristics of the generator 23, with the result that the maximum cooling capacity is available over the full range of vehicle engine rpm and loading without the need of additional control devices of any kind to modulate and/or limit the output cooling capacity of the absorption refrigeration circuit. This greatly enhances the simplicity of the equipment as well as reliability.

The absorption refrigeration system in combination with the chiller 54 provides an air conditioning and/or refrigerating system at low initial cost which keeps the high pressure components within the engine space of the vehicle for improved and increased safety and requires a minimum amount of maintenance because of design simplicity and ease of installation and produces maximum refrigerating capacity without reducing the efficiency of the mobile vehicle engine. Additionally, there is no danger of solidification or freezing of the water and ammonia mixture under any operating condition or in cold weather, since the proportion of ammonia in the mixture at the pressure in the refrigerant circuit, either when operating or not operating, prevents freezing of the solution.

I claim:

1. In combination with a vehicle having a water-cooled engine, a heating and cooling system comprising, a heat transfer unit in the passenger compartment for either heating or cooling said compartment; a liquid circuit including said heat transfer unit and mixing valve means operable to receive a hot liquid from one source and a cold liquid from another source and proportion said hot and cold liquids to provide the desired heating or cooling of the compartment, said source of hot liquid being said engine with a liquid line from the vehicle radiator to the mixing valve means, said cold liquid source being a chiller of an absorption refrigeration circuit with a liquid line therefrom to the mixing valve means; and an absorption refrigeration circuit in the engine compartment of the vehicle including said chiller, and a generator for receiving heat from the exhaust gases of the engine including a casing extending along and in contact with the exhaust conduit of the engine and of a size to provide a constant maximum cooling effect on said chiller at all engine speeds and at all loads on the vehicle.

2. A system as defined in claim 1 wherein both of said liquids are compatible mixtures of water and an anti-freeze mixture such as ethylene glycol solution.

3. A system as defined in claim 1 wherein said exhaust conduit is the engine exhaust pipe downstream from the exhaust manifold and the generator casing has a concave transverse wall curved to fit against the exhaust pipe without any cutting into the exhaust pipe, a pair of conduits extending from the upper side of said casing and communicating with a pair of chambers in the casing defined by a transverse interior baffle, and clamp means for fastening said casing to said exhaust pipe.

4. In combination with a vehicle having a prime mover providing a source of heat, a cooling system comprising, a heat transfer unit in the space to be cooled; a liquid circuit including said heat transfer unit and mixing valve means operable to receive a hot liquid from one source and a cold liquid from another source and proportion said hot and cold liquids to provide the desired cooling of said space, said cold liquid source being a chiller of an absorption refrigeration circuit with a liquid line therefrom to the mixing valve means; and an absorption refrigeration circuit including said chiller, and a generator for receiving heat from the prime mover including a casing extending along and in contact with a heat source conduit of the prime mover and of a size to provide a constant maximum cooling effect on said chiller at all operating rates of the prime mover.

5. In combination with a vehicle having a water-cooled engine, a heating and cooling system comprising, a heat transfer unit in the passenger compartment for either heating or cooling said compartment; a liquid circuit including said heat transfer unit and mixing valve means operable to receive a hot liquid from one source and a cold liquid from another source and proportion said hot and cold liquids to provide the desired heating or cooling of the compartment, said source of hot liquid being said engine with a liquid line from the vehicle radiator to the mixing valve means, said cold liquid source being a chiller of an absorption refrigeration circuit with a liquid line therefrom to the mixing valve means and both of said liquids being a mixture of water and anti-freeze solution such as ethylene glycol; and an absorption refrigeration circuit in the engine compartment of the vehicle including said chiller, and a generator having a water-ammonia solution for receiving heat from the exhaust gases of the engine including a casing extending along and in partially wrapped intimate contact with the exhaust conduit of the engine and of a size whereby said generator functions as a natural convection evaporator type of heat transfer device with unrestricted flow of the water-ammonia solution and with unrestricted flow of the exhaust gases in the exhaust conduit with resultant constant maximum cooling effect at all engine speeds and at all loads on the vehicle.

6. In combination with a vehicle having a prime mover in the form of an engine providing a source of heat, a cooling system for the passenger compartment of the vehicle utilizing an absorption refrigeration circuit including a generator for providing maximum cooling effect continuously any time after the maximum cooling effect is achieved and having a water-ammonia solution for association with the source of heat, said generator comprising, a casing having a length to extend along and externally of the exhaust pipe of the vehicle which provides the source of heat and a concave transverse wall to partially surround and have substantially continuous contact against approximately one-third or more of the exhaust pipe circumference without any breaking into the exhaust pipe to maintain the integrity of the exhaust system and eliminate the possibility of toxic gas leakage and without maintenance problems including seal leakage and subjection of parts to the high temperature and corrosive exhaust gases, said generator functioning as a natural convection evaporator type of heat transfer device and not having any adjustable parts associated therewith for modulating flow of the water-ammonia solution therethrough to have continuous heat extraction from the exhaust pipe with continuous reduction in back pressure in the exhaust pipe for best operation of said engine and whereby there is unmodulated flow of the water-ammonia solution through the generator as well as unmodulated flow of the exhaust gases through the exhaust pipe to provide the continuous maximum cooling effect in the refrigeration circuit even with varying rates of heat transfer from said heat source, and clamp means for fastening said generator casing directly against said exhaust pipe, the cooling system including a heater in the passenger compartment having a liquid coil, a chiller for cooling liquid which passes through said coil and communicating with said absorption refrigeration circuit, and mixing valve means in circuit with said liquid coil and connected to a source of hot liquid for controlling the temperature of the liquid which passes through said liquid coil.

7. The combination of claim 6 wherein said chiller is positioned outside of said passenger compartment to have complete safety of operation without any potential leakage of noxious refrigerant gases in said passenger compartment.

* * * * *